No. 677,202.  
W. H. GIBBS.  
APPLIANCE FOR SCRAPING SEWERS OR DRAINS.  
(Application filed Feb. 27, 1901.)
Patented June 25, 1901.
(No Model.)
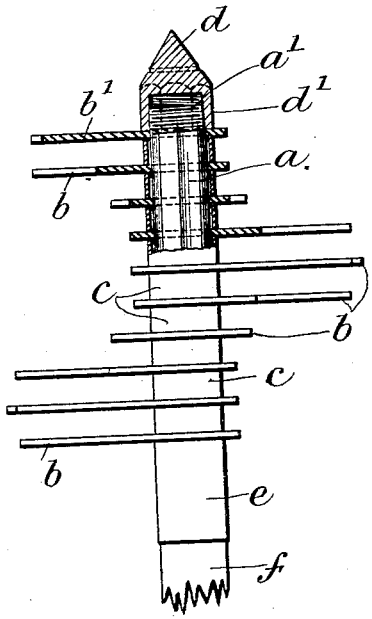
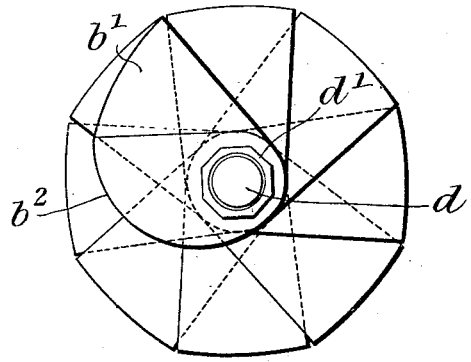
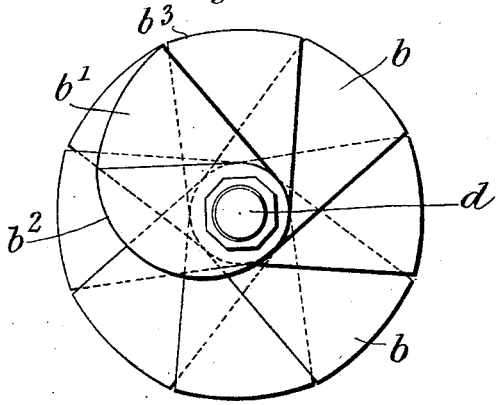
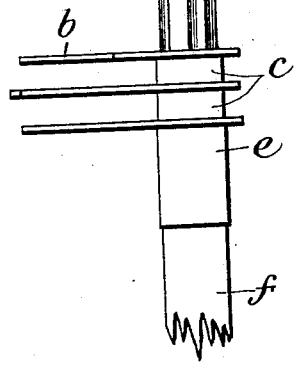
WITNESSES:
INVENTOR  
William H. Gibbs.  
BY  
ATTORNEYS.
THE NORRIS PETERS CO., PHOTO-LITHO., WASHINGTON, D. C.

UNITED STATES PATENT OFFICE.

WILLIAM H. GIBBS, OF CHATHAM, ENGLAND.

APPLIANCE FOR SCRAPING SEWERS OR DRAINS.

SPECIFICATION forming part of Letters Patent No. 677,202, dated June 25, 1901.

Application filed February 27, 1901. Serial No. 49,083. (No model.)

*To all whom it may concern:*

Be it known that I, WILLIAM HENRY GIBBS, a subject of the King of Great Britain, residing in New Brompton, Chatham, in the county of Kent, England, have invented certain new and useful Improvements in Appliances for Scraping Sewers or Drains, of which the following is a specification.

This invention has for its object to provide a scraper or appliance for scraping sewers or drains or removing obstructions therein; and my invention consists of a spiral scraper or appliance consisting of a series of blades or knives made of stout metal, such blades being of somewhat sector-like shape, and the same are mounted on a central shaft or stem on which they are spaced apart and arranged in a spiral manner, the foremost blade being of a special curved form and having a point screwed on the foremost end of said stem or shaft, so that the said appliance or scraper has a spiral form from front to rear, while the rear end of said stem or shaft is provided with a union or socket or other suitable means for attaching same to a rod or stick or equivalent means by which said scraper or appliance is inserted and rotated in the drain or sewer and withdrawn therefrom, as fully described hereinafter and finally pointed out in the claims.

Referring to the accompanying drawings, Figure 1 is a side elevation, partly in section, of a scraper or appliance according to the present invention. Fig. 2 is a plan of Fig. 1. Fig. 3 is a side elevation showing the appliance partly taken to pieces and with certain of the blades removed. Fig. 4 is a plan view showing a modification in the shape of the scraping-blades.

$a$ is the shaft or stem, (solid or hollow,) which is formed with flattened sides in any suitable manner to prevent the blades rotating upon said stem or shaft $a$. For instance, I may employ an octagonal stem or shaft $a$, as illustrated; but I do not confine myself to any particular number of flattened sides to said stem.

$b$ $b$ are the knives or scraper-blades, the inner end of each said blade being provided with an aperture corresponding to the shape of the stem $a$ and adapted to fit closely thereover, so that said blades $b$ cannot be revolved with respect to said stem $a$.

$c$ $c$ are spacing rings or washers adapted to be placed on the stem $a$ between each of the blades $b$, so as to space apart said blades $b$, the width of said washers or spacing-rings $c$ being regulated according to the distance which it is desired to keep said blades apart from one another. For instance, with blades $b$ of three-inch radius the spacing-rings $c$ may be about half an inch in width, so as to thus keep said blades $b$ spaced apart half an inch from each other.

The foremost blade $b'$ is specially shaped— namely, with one side edge thereof $b^2$ curved, as shown in Figs. 2 and 4—and also the second blade may be specially curved on its outer edge $b^3$, so as thus to form a spiral from the point $d$ to the outer edge of the following successive blades, all of which are arranged successively in spiral form and spaced apart, as shown in Fig. 1. The point $d$ is formed of a metal cap, advantageously of wrought-iron, with a solid conical end, the lower part $d'$ of said cap being hollow and internally screw-threaded, so as to screw onto the screw-thread $a'$ on the front end of the stem or shaft $a$, the outside of the lower part $d'$ of said cap $d$ being advantageously flattened—for instance, octagonal—and adapted to receive a spanner thereon whereby to screw up said cap tightly against the series of blades $b$ and spacing-washers $c$ on said stem $a$, to thus secure and hold the whole series of blades and washers rigidly on said stem. The rear end of said stem $a$ is provided with any suitable means to attach said scraper or appliance to the operating rod or stick or device by means of which said scraper can be rotated while being forced into and withdrawn from the drain or sewer. For instance, the rear end of said stem $a$ may be provided with a brass union or socket $e$, the front end of which socket $e$ forms an abutment or shoulder against which the whole series of blades $b$ and washers $c$ are forced up tightly by the pointed screw-cap $d$, or I may form the part $e$ as an enlargement of the stem or shaft $a$, with a socket in the rear end of said part $e$.

$f$ is a stick or operating-rod attached to the socket or enlargement $e$, whereby said scraper or device can be rotated while being forced along the drain or sewer.

The outermost edge of the blades $b$ may be curved to the actual radius of each said blade—for instance, as shown in Fig. 2—or said outermost edge may be curved to any other desired radius—for instance, to a longer radius than the actual radius of the blade itself, as shown in Fig. 4. For example, the scraping appliance constructed according to the present invention, with a maximum diameter of six inches for employment in an eight-inch circular drain, may have the outer edge of the blades $b$ of said appliance formed to the same radius as the curve of said eight-inch drain—that is to say, the outer edge of said blades may be curved to a radius of four inches, in which case the scraping appliance will be found to work smoothly and evenly in said eight-inch circular drain-pipe or sewer.

The spiral form of the nose and body of this scraping appliance, in conjunction with the spacing apart of the blades, gives many advantages in use, enabling said appliance to ride over cracks, crevices, or unevennesses in the drain or sewer and to get past obstructions or obstructive matter or to bore into the latter, and thereby enable same to be withdrawn.

Having now described my invention, what I claim as new, and desire to secure by Letters Patent of the United States, is—

1. An appliance for scraping sewers or drains or for removing obstructions therein—consisting of the arrangement and combination with a central stem having flattened sides, of a series of spaced-apart rigid scraping-blades of sector-like form having the inner ends thereof fitted on said stem in a non-revoluble manner and arranged in a spiral form around said stem, means to space apart said spirally-arranged blades, a specially-curved foremost blade, means to lock and firmly hold said spirally-arranged blades on said stem, and means to rotate said appliance while forcing same along a drain or sewer, substantially as and for the purposes set forth.

2. An appliance for scraping sewers or drains or for removing obstructions therein—consisting of the arrangement and combination with a central metal stem having flattened sides, of a series of spaced-apart rigid scraping-blades of sector-like form having the inner ends thereof fitted on said stem in a non-revoluble manner and arranged in a spiral form around said stem, means to space apart said spirally-arranged blades, a specially-curved foremost blade, a conically-pointed metal screw-cap adapted to be screwed on the front end of said stem to thereby lock and firmly hold said spirally-arranged blades in position on said stem, and means to rotate said appliance while forcing same along a drain or sewer, substantially as and for the purposes set forth.

3. An appliance for scraping sewers or drains or for removing obstructions therein—consisting of the arrangement and combination with a central metal stem $a$ having flattened sides, of a series of rigid scraping-blades $b$ of sector-like form having the inner ends thereof fitted on said stem in a non-revoluble manner and arranged in a spiral form around said stem $a$, spacing rings or washers $c$ to space apart said blades $b$, a specially-curved foremost blade $b'$—viz., with a spirally-curved side edge $b^2$, a conically-pointed metal screw-cap $d$ adapted to be screwed on the front end $a'$ of said stem $a$, a union $e$ adapted to have attached thereto the means for operating said appliance said union $e$ forming an abutment against which the whole series of spirally-arranged blades $b$ and spacing-washers $c$ are forced and locked in rigid position by the screw-cap $d$, and means to rotate said appliance while forcing same along the drain or sewer, substantially as and for the purposes set forth.

In witness whereof I have hereunto set my hand in presence of two witnesses.

WILLIAM H. GIBBS.

Witnesses:
GEORGE V. STARLEY,
FRED BAKER.